United States Patent
Prat et al.

(10) Patent No.: US 12,071,067 B2
(45) Date of Patent: Aug. 27, 2024

(54) METHOD FOR CONTROLLING A LUMINOUS DEVICE WITH A VIEW TO EMITTING A PIXELATED LIGHT BEAM

(71) Applicant: VALEO VISION, Bobigny (FR)

(72) Inventors: Constantin Prat, Bobigny (FR); Hafid El Idrissi, Bobigny (FR); Ali Kanj, Bobigny (FR)

(73) Assignee: Valeo Vision, Bobigny (FR)

(*) Notice: Subject to any disclaimer, the term of this patent is extended or adjusted under 35 U.S.C. 154(b) by 392 days.

(21) Appl. No.: 17/605,606

(22) PCT Filed: May 11, 2020

(86) PCT No.: PCT/EP2020/063032
§ 371 (c)(1),
(2) Date: Oct. 22, 2021

(87) PCT Pub. No.: WO2020/234021
PCT Pub. Date: Nov. 26, 2020

(65) Prior Publication Data
US 2022/0203883 A1      Jun. 30, 2022

(30) Foreign Application Priority Data
May 20, 2019 (FR) ........................................ 1905254

(51) Int. Cl.
*B60Q 1/14*      (2006.01)
*B60Q 1/08*      (2006.01)

(52) U.S. Cl.
CPC ............. *B60Q 1/143* (2013.01); *B60Q 1/085* (2013.01); *B60Q 2300/132* (2013.01); *B60Q 2300/136* (2013.01)

(58) Field of Classification Search
CPC .................................. B60Q 1/143; B60Q 1/085
See application file for complete search history.

(56) References Cited

U.S. PATENT DOCUMENTS

| 8,733,939 B2 | 5/2014 | Othmer |
| 10,005,384 B2 | 6/2018 | Canonne et al. |

(Continued)

FOREIGN PATENT DOCUMENTS

| CN | 106662310 A | 5/2017 |
| CN | 107155233 A | 9/2017 |

(Continued)

OTHER PUBLICATIONS

Tristan Garcia: "DLP5531-Q1 Chipset Video Processing for Light Control Applications", Oct. 1, 2018, XP055664973, extracted from the Internet <http://www.ti.com/lit/an/dlpa101/dlpa101.pdf>, Texas Instruments, Dallas, Texas.

(Continued)

*Primary Examiner* — Bryon T Gyllstrom
(74) *Attorney, Agent, or Firm* — Valeo Vision (57) ABSTRACT

The invention relates to a method for controlling a luminous device of a motor vehicle arranged to emit a pixelated light beam in a preset emission region. The method includes receiving an instruction to emit a desired pixelated luminous function for each of the luminous modules. The instruction for creating a digital image forming one segment of the desired pixelated luminous function in a frame corresponding to the preset emission region of the luminous module, the digital image being independent of the types of light sources and of optical device of the luminous module. The method further correcting said created digital image depending on the types of light sources and of optical device of the luminous module. The method additionally emitting, with the luminous module, into the preset emission region, a pixelated light beam corresponding to the corrected digital image.

18 Claims, 5 Drawing Sheets

(56) References Cited

U.S. PATENT DOCUMENTS

| | | | |
|---|---|---|---|
| 10,344,931 B2 | 7/2019 | Winterer et al. | |
| 10,457,199 B2 | 10/2019 | Kunii et al. | |
| 2015/0035440 A1* | 2/2015 | Spero | F21S 41/147 |
| | | | 315/153 |
| 2017/0192224 A1* | 7/2017 | Logiudice | G02B 26/0833 |
| 2018/0118099 A1 | 5/2018 | Kunii et al. | |
| 2020/0207261 A1* | 7/2020 | Camras | H05B 45/20 |
| 2021/0107397 A1* | 4/2021 | Unterweger | H04N 9/69 |
| 2021/0354619 A1* | 11/2021 | Mimoun | B60Q 1/143 |

FOREIGN PATENT DOCUMENTS

| | | |
|---|---|---|
| JP | 2007182151 A | 7/2007 |
| JP | 2010095048 A | 4/2010 |
| JP | 2019038279 A | 3/2019 |
| WO | 2016113818 A1 | 7/2016 |

OTHER PUBLICATIONS

European Patent Office, International Search Report (with English translation) and Written Opinion of corresponding International Application No. PCT/EP2020/063032, dated Jul. 13, 2020.

Japanese Patent Office, Office Action (w/English translation) of corresponding Japanese Patent Application No. 2021-569160, dated Dec. 20, 2022.

China Patent Office, First Office Action (with English translation) of corresponding Chinese Application No. 202080037033.7, dated Mar. 28, 2024.

* cited by examiner

METHOD FOR CONTROLLING A LUMINOUS DEVICE WITH A VIEW TO EMITTING A PIXELATED LIGHT BEAM

CROSS-REFERENCE TO RELATED APPLICATIONS

This is a 371 application (submitted under 35 U.S.C. § 371) of International Application No. PCT/EP2020/063032 (WO2020/234021) filed on Nov. 26, 2020, which claims the priority date benefit of French Application No. FR1905254 filed on May 20, 2019, the disclosures of which are hereby incorporated by reference in their entirety.

TECHNICAL FIELD

The invention relates to the field of lighting and/or signaling for motor vehicles. The invention relates more specifically to a method for controlling a lighting device so as to emit a pixelated light beam.

BACKGROUND

The field of lighting and/or signaling for motor vehicles discloses devices that comprise enough selectively activatable light sources, associated with an optical device, to allow the implementation of pixelated lighting functions, for example containing at least 500 pixels, each pixel being formed by an elementary light beam emitted by one of the light sources. For headlights of a host vehicle illuminating the road, this type of device makes it possible for example to implement in particular anti-dazzle high-beam lighting functions, in which some pixels of the high beam are deactivated or attenuated for a target vehicle being followed or passed, ground writing functions, in which some low-beam pixels are over-brightened or attenuated in order to display a pictogram, or even ground marking functions, in which some pixels of the low beam are over-brightened or attenuated in order to create markings such as lines. For signaling devices, this type of device makes it possible to display images on a screen, in particular for the purpose of warning road users. It should be noted that these functions are dynamic functions, the content of which is required to change regularly while the vehicle is moving.

SUMMARY

In order to control this type of device, a central computer receives information from various sensors, such as a camera filming the road, a steering wheel angle sensor, or a navigation system, determines which type of pixelated lighting function should be emitted by the device, and periodically sends an instruction to emit this desired function to the device. In order not to overload the communications network on board the vehicle, the instructions sent by the computer generally contain the type of function and the associated parameters, such as for example the position of a vehicle not to be dazzled. A control device, each time it receives an emission instruction, defines, for each light source, the luminous intensity that this light source should emit so that the elementary beam that it emits forms the pixel required to implement the desired pixelated lighting function.

Known lighting devices for emitting a pixelated lighting function may comprise multiple types of light sources and optical device. Among the various types of light sources, it is possible to identify in particular matrix-arrays of light-emitting diodes, monolithic pixelated light sources, light sources associated with a matrix-array of micromirrors, laser sources associated with a scanning system and with a conversion material, or even light sources associated with an LCD screen. Now, each type of light source involves intrinsic emission features for the lighting device, in particular in terms of shape and homogeneity of each pixel formed by each light source, as well as in terms of overall homogeneity of the pixelated beam produced by the lighting device due to the crosstalk between the elementary beams emitted by mutually adjacent light sources and manufacturing tolerances of each of the light sources. These intrinsic features are amplified depending on the type of optical device used in the lighting device, which in particular introduces distortion and vignetting defects in the pixelated beam.

It is thus necessary to take these various intrinsic features into account when controlling each of the light sources so as to implement a desired pixelated lighting function. This constraint results in significant computing operations upstream of the implementation of the desired pixelated lighting function that are specific to the types of light sources and optical device used, so as to define, for each light source, the intensity of the elementary light beam that it has to emit in order to project a pixelated beam that best approximates the desired pixelated lighting function. These operations are also further complicated when the lighting device comprises multiple lighting modules that are each able to emit a pixelated light beam in a predetermined emission area. The method for controlling light sources implemented by the control device is therefore dependent entirely on the types of light sources and optical device of the lighting device, and therefore has to be completely rethought when seeking to adapt it to controlling a new lighting device.

When seeking to achieve standardization and reduce development costs, there is thus a need for a control method that makes it possible to control a lighting device so as to emit various types of pixelated lighting functions, and that is easily adaptable to various types of light sources and optical device that are used in the lighting device. The present invention aims to address this need.

For these purposes, one subject of the invention is a method for controlling a lighting device of a motor vehicle comprising one or more lighting modules, each module comprising a plurality of light sources and an optical device that are designed to emit a pixelated light beam in a predetermined emission area, the method comprising the following steps:
  a. Receiving an instruction to emit a desired pixelated lighting function;
  b. For each of the lighting modules, creating a digital image implementing a portion of the desired pixelated lighting function within a frame corresponding to the predetermined emission area of the lighting module, the digital image being independent of the types of light sources and optical device of the lighting module;
  c. For each of the lighting modules, correcting said created digital image on the basis of the types of light sources and optical device of the lighting module;
  d. For each of the lighting modules, emitting, using the lighting module, a pixelated light beam in the predetermined emission area corresponding to the corrected digital image.

Thus, for each module, the method first of all makes it possible to generate a digital image that corresponds substantially to the portion of the pixelated lighting function that has to be emitted by the module in the emission area that it is capable of addressing. This predetermined emission area is defined in particular by the position of the lighting module, its orientation, in particular vertical and/or horizontal, and its field of view. Since the digital image is created independently of the features in relation to the types of light sources and optical device present in the lighting module, this step allows the method to be implemented for all types of lighting device. The digital image is then corrected so as to be adapted to these types of light sources and optical device. The correction may thus be easily configured on the basis of these types, without the step of creating the digital image being affected.

Advantageously, the method according to the invention periodically receives instructions to emit a desired pixelated lighting function, each instruction possibly being the emission of a new pixelated lighting function different from the pixelated lighting function emitted following the previously received instruction or the emission of a pixelated lighting function in which only one or more parameters are different from those of the lighting function emitted following the previously received instruction. Where applicable, a new digital image is created for each received emission instruction. The received instructions may be instructions to emit one or more pixelated lighting functions, in particular chosen from among: a regulatory photometric function, an anti-dazzle function, a road following function, a ground writing function and a ground marking function, accompanied by one or more parameters required to execute said function, and in particular the position of an object not to be illuminated, one or more features relating to the vehicle or to the movement of the vehicle, or even a type of pictogram or pattern. Each received instruction may thus combine multiple pixelated lighting functions.

The created digital image comprises a predetermined number of pixels, each pixel containing for example a grayscale level. If desired, the predetermined number of pixels may be identical to the number of pixels able to be emitted by the lighting module. As a variant, the predetermined number of pixels may be different from the number of pixels able to be emitted by the lighting module. Where applicable, the created digital image is independent of the resolution of the lighting module.

According to one embodiment of the invention, the step of creating the digital image comprises selecting at least one photometric image stored in memory, corresponding to a predetermined regulatory photometric function, so as to form a base image in the frame on the basis of the received transmission instruction, the digital image being created from the base image. Where applicable, the received emission instruction contains an identifier of said predetermined regulatory photometric function. By virtue of this feature, it is possible to very easily and quickly define a digital image for each lighting module, such that the lighting device emits a regulatory photometric function.

Advantageously, the photometric image contains as many pixels as the predetermined number of pixels of the digital image. It therefore extends entirely within the frame corresponding to the predetermined emission area of the lighting module. Each pixel of the photometric image may represent a luminous intensity value for said predetermined regulatory photometric function at a given point in space, for example in a projection onto a screen. The photometric image stored in memory may thus represent a portion of or the entire projection of the predetermined regulatory photometric function in the predetermined emission area of the lighting module. This may in particular be a low-beam function, a high-beam function or a highway function, the contour and in particular the cut-off and the light distribution of which are defined by law. Where applicable, the received emission instruction may comprise an identifier of a given regulation, such that a photometric image corresponding to the desired photometric function is selected in accordance with said regulation.

According to one exemplary embodiment, a transformation may be applied to the selected photometric image on the basis of the received emission instruction so as to form the base image, it being understood that the frame corresponding to the predetermined emission area of the lighting module remains fixed during the transformation. Where applicable, the received emission instruction contains an instruction of the type of transformation to be applied, as well as the values necessary to apply the transformation to the selected photometric image.

In a first example, this feature makes it possible to implement what is called a dynamic bend function, in particular in which the lighting device emits a low beam at least a portion of which is transformed so as to illuminate the bend. In this example, the received emission instruction may contain for example a steering wheel angle, and a translation or an elongation is applied to the selected photometric image on the basis of this steering wheel angle.

In another example, this feature makes it possible to implement a function of adapting the lighting to speed, in particular in which the device emits a more or less concentrated high beam in order to illuminate to a greater or lesser extent depending on the speed of the vehicle. In this example, the received emission instruction may contain for example an adaptation factor dependent on the speed of the vehicle, and an elongation or a contraction is applied to the photometric image on the basis of this adaptation factor. The elongation or contraction may be applied vertically and/or horizontally such that the luminous flux emitted by the lighting module remains unchanged.

If desired, the step of creating the digital image may comprise selecting two photometric images stored in memory, each corresponding to a predetermined regulatory photometric function, the base image being formed by fusing the two selected photometric images. Advantageously, the received emission instruction may contain a fusion instruction and possibly a fusion coefficient. Where applicable, the two selected photometric images are fused taking into account said fusion coefficient. This feature makes it possible to implement what is called a transition function between two regulatory photometric functions.

According to one alternative or additional embodiment of the invention, the step of creating the digital image comprises selecting at least one layer stored in memory and/or constructing at least one layer, and positioning the layer in the frame so as to form a base image in the frame on the basis of the received emission instruction, the digital image being created from the base image. The stored or constructed layer may in particular correspond to a pictogram, such as an arrow, a road sign image or even a pedestrian crossing, or to a pattern such as a ground marking. For example, a layer is understood to mean an image of dimensions smaller than those of the frame and all of the pixels of which have a value of zero except for the pixels forming the pictogram or the pattern. Where applicable, the received emission instruction contains an identifier of the layer to be selected or to be constructed and coordinates for positioning the layer in the frame. This feature makes it possible to implement a ground writing function in which the lighting device emits a low beam in which a pictogram has been formed, or else a ground marking function in which the lighting device emits a low beam in which longitudinal lines have been formed.

Advantageously, the base image may be constructed by adding the one or more layers to a black image that fills the frame, or as a variant by subtracting the one or more layers from a white image that fills the frame, or as another variant by adding or subtracting the one or more layers to or from a photometric image corresponding to a regulatory photometric function such as obtained beforehand.

If desired, at least one transformation may be applied to the layer, in particular an intensity attenuation, an anamorphosis, a rotation or a modification of the dimensions of the layer. Where applicable, the received emission instruction contains an identifier of the one or more transformations to be applied to the layer as well as parameters for executing this or these transformations. If desired, an anti-aliasing filter may be applied to the created digital image.

Advantageously, the step of creating the digital image comprises selecting one or more masks stored in memory and/or constructing one or more masks on the basis of the received emission instruction, the digital image being created by successively applying said one or more masks that are selected and/or constructed to the base image. A mask is understood to mean a matrix of dimensions smaller than or identical to those of the frame, and in which each cell has a coefficient of between 0 and 1. Where applicable, the received emission instruction contains an identifier of each type of mask to be selected or constructed and the parameters necessary for the selection or construction and for the application of each mask to the base image, such as for example the coefficient. For example, applying a mask to the base image may consist in multiplying the value of each pixel of the base image or of an area of the base image by the coefficient of the cell with coordinates corresponding to those of said pixel.

According to one exemplary embodiment, an anti-dazzle mask is constructed that contains at least one dark tunnel positioned on the basis of the received emission instruction and in which said anti-dazzle mask is applied to the base image. Where applicable, the received emission instruction contains positioning coordinates of the dark tunnel in the mask. For example, the coefficient of all of the cells corresponding to the dark tunnel may be 0. The dark tunnel thus created makes it possible to implement an adaptive high-beam function in which the lighting device emits a beam that illuminates the entire road except for an area located level with a target vehicle being followed or passed so as to avoid dazzling it. As a variant, the coefficient of all of the cells corresponding to the dark tunnel is greater than or equal to 0 and strictly less than 1. The dark tunnel thus created makes it possible to implement an anti-dazzle function in which the lighting device illuminates emits a beam illuminating the entire road except for an area located level with a signpost so as to avoid a dazzling back-reflection.

If desired, the received emission instruction may contain an identifier of the shape of the dark tunnel, the dark tunnel being selected or constructed so as to have the identified shape. It may for example be a rectangle or a hexagon. If desired, the received emission instruction may contain sharpness parameters, the dark tunnel being selected or constructed so as to have, at its periphery, an intensity gradient corresponding to the sharpness parameters.

According to another additional or alternative exemplary embodiment, an attenuation mask comprising a vertical or oblique attenuation gradient is applied to all or part of the base image. Where applicable, the received emission instruction contains an identifier of a type of gradient. For example, the coefficient of each cell of the attenuation mask may be dependent on the reciprocal of the square of the distance of the corresponding pixel of the pixelated light beam emitted by the lighting module from the position of the lighting module. The intensity of the pixelated light beam is thus homogenized along the predetermined emission area. As another example, the coefficient of each cell may be dependent on the overlap of the corresponding pixel of the pixelated light beam emitted by the lighting module with another light beam emitted by another lighting module of the same lighting device or of another lighting device. As a variant, the attenuation mask may be centered on a pictogram or a pattern formed in the base image.

According to one embodiment of the invention, the step of correcting the created digital image comprises sampling the created digital image on the basis of the number of light sources of the lighting module. The created digital image is thus adapted to the resolution of the lighting module.

Advantageously, the step of correcting the created digital image comprises applying a mask or a compensation filter determined by the types of light sources and optical device of the lighting module to the created digital image. According to one exemplary embodiment, the correction step may comprise applying a filter the coefficients of which have been determined beforehand so as to compensate for distortion-based geometric aberrations introduced by the types of light sources and optical device of the lighting module, these coefficients being for example determined by way of polynomial modeling of the distortion phenomenon. If desired, the coefficients of the filter may furthermore be determined so as to compensate firstly for vignetting phenomena, so as to obtain a homogeneous light beam at the output of the lighting module, and secondly for inter-pixel overlap phenomena (or crosstalk) by taking into account the effect of each light source on the pixels formed by neighboring sources, for example by performing intensity pairing so as to determine the behavior of each pixel with respect to these neighbors.

Again advantageously, the step of correcting the created digital image comprises applying an anti-aliasing filter to the created digital image.

Again advantageously, the step of correcting the created digital image comprises applying a homogeneity mask determined on the basis of the relative homogeneity of the light sources of the lighting module with respect to one another to the created digital image. This thus compensates for inhomogeneities created due to manufacturing tolerances of the light sources and of the lighting module.

Again advantageously, the step of correcting the created digital image comprises applying a translation and/or a rotation to the created digital image on the basis of the pitch of the motor vehicle, of the roll of the motor vehicle or of the slope of the road on which the motor vehicle is moving, it being understood that the frame corresponding to the predetermined emission area of the lighting module remains fixed during the translation and/or the rotation. If the translation and/or the rotation causes a portion of the created digital image to leave the frame, the correction step may comprise applying an attenuation mask to the corrected digital image in order to prevent drops in luminous intensities at the edges of the frame.

In one embodiment of the invention, the corrected digital image is transmitted to a control unit for controlling the lighting module, which selectively controls each of the light sources of the lighting module so that this light source emits an elementary light beam forming a pixel with a luminous intensity corresponding to the value of the corresponding pixel of the corrected digital image. Where applicable, the steps of creating and correcting the digital image may be implemented by a single controller separate from the control unit for controlling the lighting module. A light source is understood to mean any light source possibly associated with an electro-optical element, capable of being activated and controlled selectively so as to emit an elementary light beam the luminous intensity of which is possibly able to be controlled. This could in particular be a light-emitting semiconductor chip, a light-emitting element of a monolithic pixelated light-emitting diode, a portion of a light-converting element able to be excited by a light source, or even a light source associated with a liquid crystal or with a micromirror.

Another subject of the invention is a computer program comprising a program code that is designed to implement the method according to the invention.

Another subject of the invention is a data medium on which the computer program according to the invention is recorded.

Another subject of the invention is a lighting device comprising at least one lighting module comprising a plurality of light sources and a control unit for selectively controlling each of the light sources, the lighting device comprising a controller designed to control the control unit, the lighting device implementing the method according to the invention.

BRIEF DESCRIPTION OF THE DRAWINGS

The present invention is now described with the aid of examples that are only illustrative and in no way limit the scope of the invention, and based on the accompanying illustrations, in which.

DETAILED DESCRIPTION

In the following description, elements that are identical in terms of structure or in terms of function and that appear across various figures retain the same references, unless indicated otherwise.

Figure 1:
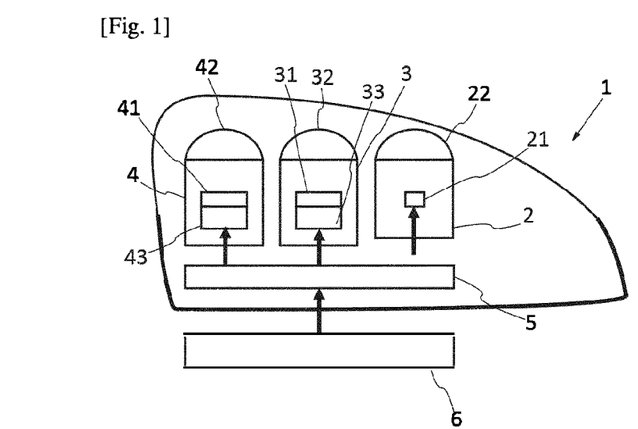
FIG. 1 shows a lighting device of a motor vehicle.
Figure 2:
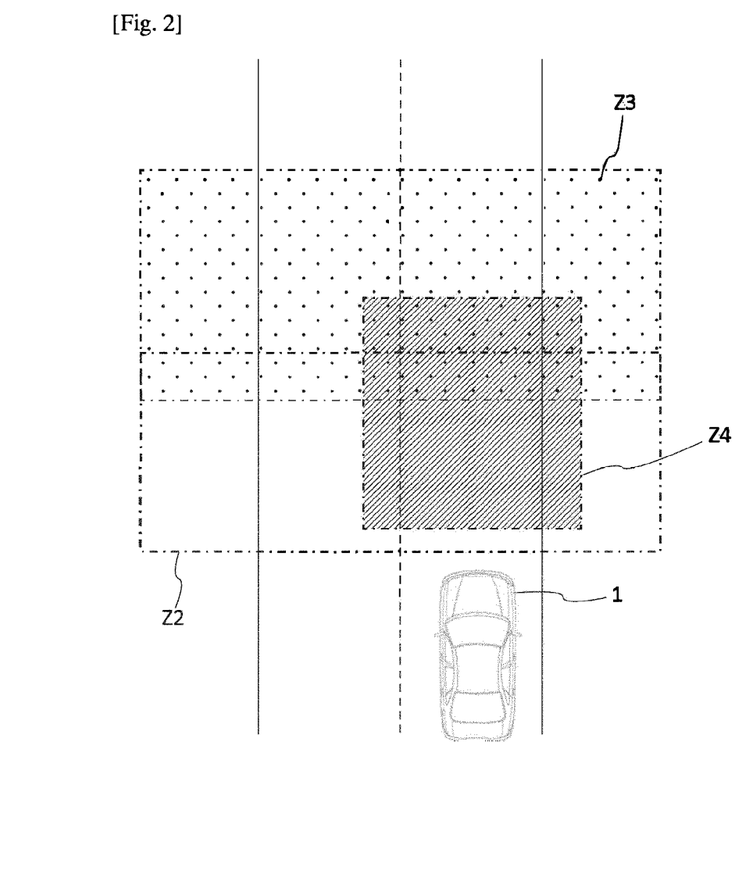
FIG. 2 shows a plan view of the emission areas of the lighting modules of the device from FIG. 1.
Figure 3:
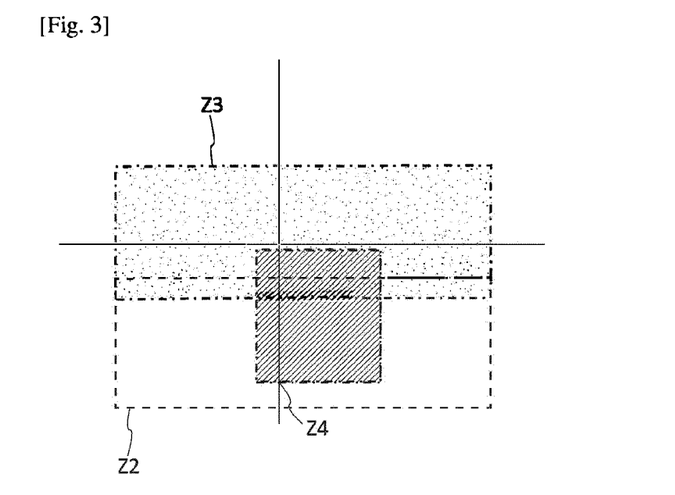
FIG. 3 shows a projection onto a screen of the emission areas of the lighting modules of the device from FIG. 1.

FIG. 1 shows a right-hand lighting device 1 of a motor vehicle. This lighting device 1 comprises three lighting modules 2, 3 and 4 each capable of emitting a light beam in a predetermined emission area Z2, Z3 and Z4, respectively. The predetermined emission areas Z2 to Z4, which are able to be addressed by each of the lighting modules 2 to 4, are shown in a plan view in FIG. 2 and projected onto a screen in FIG. 3. The lighting module 2 comprises a light source 21 associated with a lens 22 for emitting a light beam with a horizontal cut-off in the area Z2. Each of the lighting modules 3 and 4 comprises a pixelated light source 31 and 41 associated with a lens 32 and 42 for emitting a pixelated light beam in the area Z3 and Z4. In the example described, the pixelated light sources 31 and 41 are monolithic pixelated light-emitting diodes, each of the light-emitting elements of which forms a light source that is able to be activated and controlled selectively by a control unit 33 and 43 so as to emit an elementary light beam the luminous intensity of which is able to be controlled, and thus forming one of the pixels of the pixelated light beam. To this end, the lighting device 1 comprises a controller 5 designed to control the control units 33 and 43 so as to selectively control each of the light-emitting elements of the light sources 31 and 41 as well as the light source 21, on the basis of an instruction to emit a desired pixelated lighting function received from a controller 6.

Figure 4:
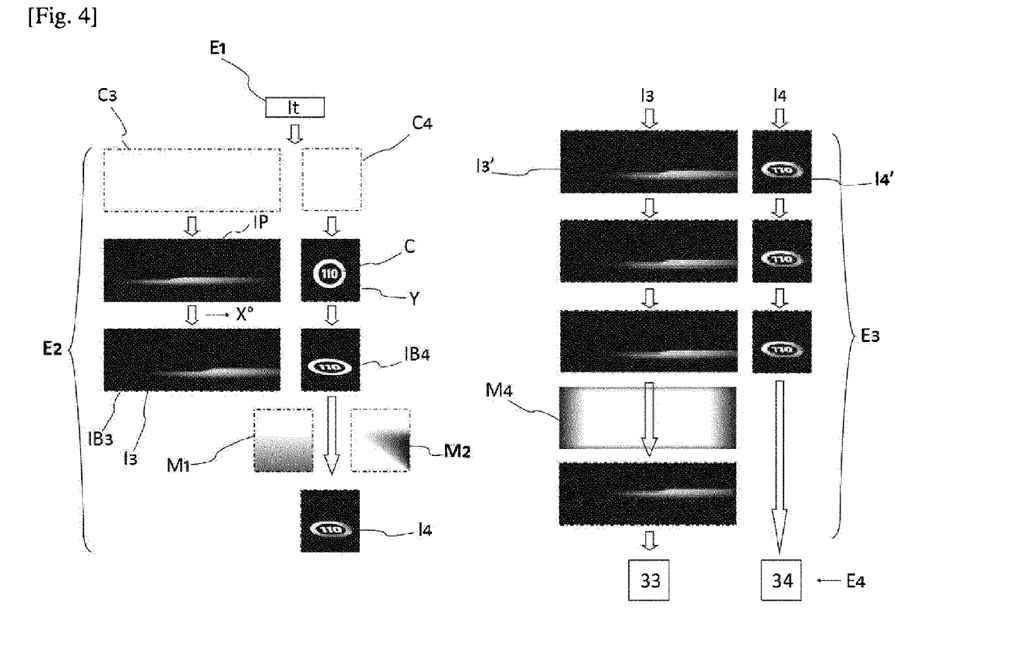
FIG. 4 shows a method for controlling the device from FIG. 1 according to a first embodiment of the invention.

FIG. 4 shows a method for controlling the lighting device 1 so as to emit a desired pixelated lighting function according to one embodiment of the invention. Since the lighting module 2 is not able to emit a pixelated light beam, the controlling of this lighting module 2 by the controller 5 will not be described below.

In a first step E1, the controller 5 receives, from the controller 6 at a given time, an instruction It to emit a low-beam function in accordance with European regulations, plus a dynamic bend function for an angle of X degrees to be implemented through translation, and a ground writing function for writing a pictogram of a 110 km/h speed limit on the ground, to be positioned on the road according to a set of coordinates Y with an anamorphosis, the intensity of the ground writing function having to be attenuated due to the close projection distance of the vehicle and the overlap with the left-hand lighting device of the vehicle.

Upon receiving the instruction, in a second step E2, the controller 5 will create, for each of the lighting modules 3 and 4, a digital image I3 and I4 implementing a portion of the desired pixelated lighting function in a frame C3 and C4, the frames C3 and C4 corresponding to the predetermined emission areas Z3 and Z4 able to be addressed by these lighting modules 3 and 4. The digital images I3 and I4 that will be created comprise a predetermined number of pixels and completely fill the frames C3 and C4. It should be noted that the dimensions of the frames C3 and C4 have been defined beforehand with respect to the dimensions and position of the predetermined emission areas Z3 and Z4, and in particular on the basis of the positions of the lighting modules 3 and 4, their inclines and their fields of view.

For the lighting module 3, the controller 5 selects, from its memory, a photometric image IP corresponding to a low-beam function in accordance with European regulations. In the example shown, and given the dimensions and the position of the emission area Z3, this is a photometric image IP depicting a projection, onto a screen, of an upper portion of a low-beam function in accordance with European regulations, having a cut-off. For the lighting module 4, the controller selects, from its memory, a layer C representing a 110 km/h speed limit pictogram and adds this layer to a black image by positioning it at a position corresponding to the set of coordinates Y.

Second of all, a transformation will be applied to each of these images by the controller 5. For the lighting module 3, the controller 5 applies a horizontal translation, corresponding to the angle of X degrees, to the photometric image IP in the frame C3 so as to form a base image IB3. It is thus observed that part of the photometric image IP has thus left the frame C3. For the lighting module 4, the controller applies an anamorphosis to the layer C so as to form a base image IB4. The controller furthermore applies an anti-aliasing filter to the image IB4.

Third of all, the controller 5 selects, from its memory, a first attenuation mask comprising a vertical intensity gradient M1 and a second attenuation mask comprising an oblique intensity gradient M2, each mask M1 and M2 being a matrix of dimensions identical to those of the frame C4 and the cells of which contain coefficients of between 0 and 1. The vertical gradient of the mask M1 has been calculated such that the coefficient of each cell of the mask M1 corresponds to the reciprocal of the square of the distance of a corresponding pixel in the area Z4. The oblique gradient of the mask M2 has been calculated such that the coefficient of each cell of the mask M2 decreases linearly obliquely upwards. The controller 5 thus successively applies the masks M1 and M2 to the base image IB4, by multiplying the values of each pixel of the base image IB4 by the coefficient of the cell with the same coordinates of the masks M1 and M2 so as to obtain a digital image I4. In the example described, no mask is applied to the base image IB3, the base image IB3 thus becoming the digital image I3.

As has been described, the digital images I3 and I4 that were created in step E1 are independent of the intrinsic emission features of each of the lighting modules 3 and 4 in the predetermined emission areas that they address, specifically the type and the resolution of the pixelated light source and the type of optical device of these modules. These digital images I3 and I4 may thus be used for any type of lighting module.

In a third step E3, each digital image I3 and I4 will be corrected by the controller 5 on the basis of the types of light sources 31 and 41 and optical device 32 and 42 and on the basis of the resolution of the lighting modules 3 and 4.

First of all, the digital images I3 and I4 are sampled by the controller 5 so as to obtain digital images I3' and I4' with a resolution corresponding to those of the lighting modules 3 and 4.

The controller 5 then applies a filter to the sampled digital images I3' and I4' so as to adapt the values of the pixels of these images so as to compensate for the shape and the homogeneity of the pixels created by the light-emitting elements of the pixelated light sources 31 and 41, the inter-pixel overlaps between them and the aberrations and the inhomogeneities such as vignetting and distortion introduced by the lenses 32 and 42.

The controller 5 then applies a homogeneity mask in order to compensate for the differences in relative homogeneities of the pixels with respect to one another due to manufacturing tolerances of the light sources.

Finally, the controller 5 applies an upward translation to the image I3' corresponding to the slope on which the vehicle is moving, and an attenuation mask M3. The attenuation mask M3 has been determined such that the coefficients of the attenuation mask M3 introduce an intensity gradient at the edges of the frame C3.

Figure 5:
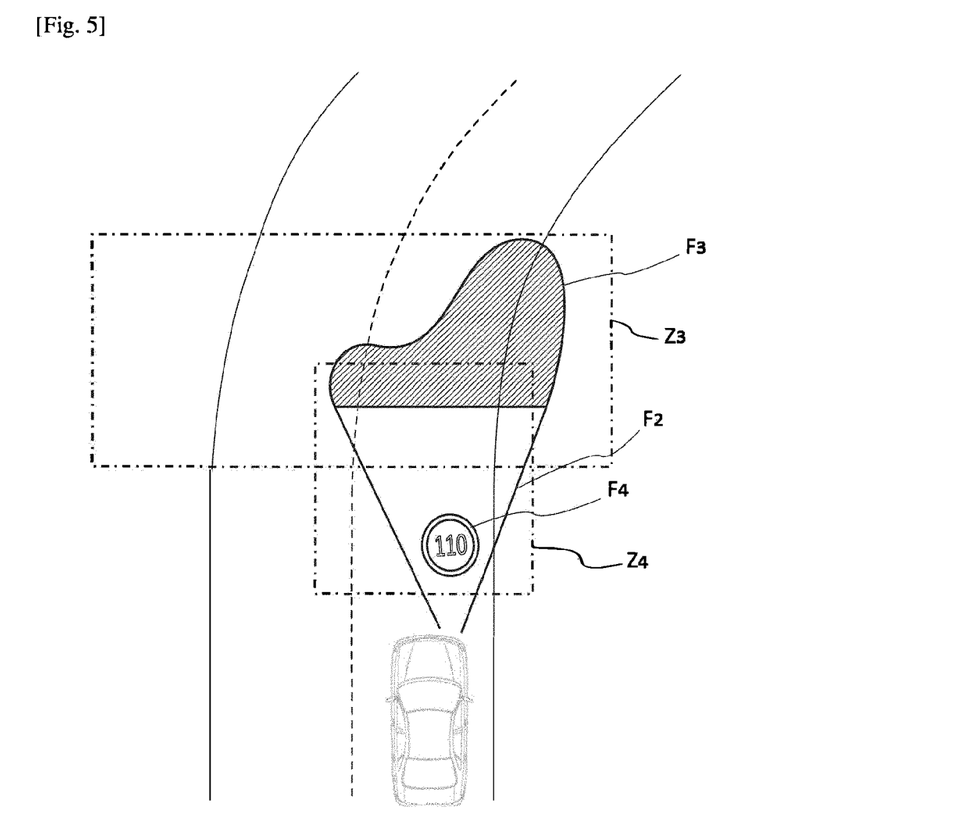
FIG. 5 shows a plan view of the light beams emitted by the device from FIG. 1 controlled by the method according to FIG. 4.
Figure 6:
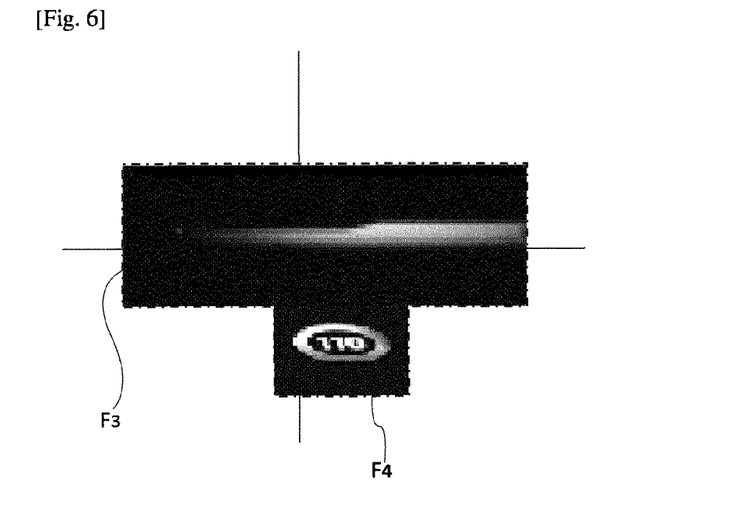
FIG. 6 shows a projection onto a screen of the light beams emitted by the device from FIG. 1 controlled by the method according to FIG. 4.

Finally, in a fourth step E4, the corrected digital images I3' and I4' are transmitted to the control units 33 and 43 of the modules 3 and 4, which selectively control each of the light-emitting elements of the light sources 31 and 41 so as to emit an elementary light beam forming, in the predetermined emission area Z3 and Z4, a pixel the intensity of which corresponds to the value of the corresponding pixel in the corrected digital image. FIG. 5 thus shows a plan view of the pixelated beams F3 and F4 emitted by the lighting modules 3 and 4, as well as the beam F2 emitted by the lighting module 2, and FIG. 6 shows a projection of these beams F3 and F4 onto a screen. It should be noted that the beam F4 is superimposed on the beam F2 so as to highlight the 110 km/h speed limit pictogram.

Upon each new received instruction, the controller 5 thus generates new digital images for the lighting modules 3 and 4.

Figure 7:
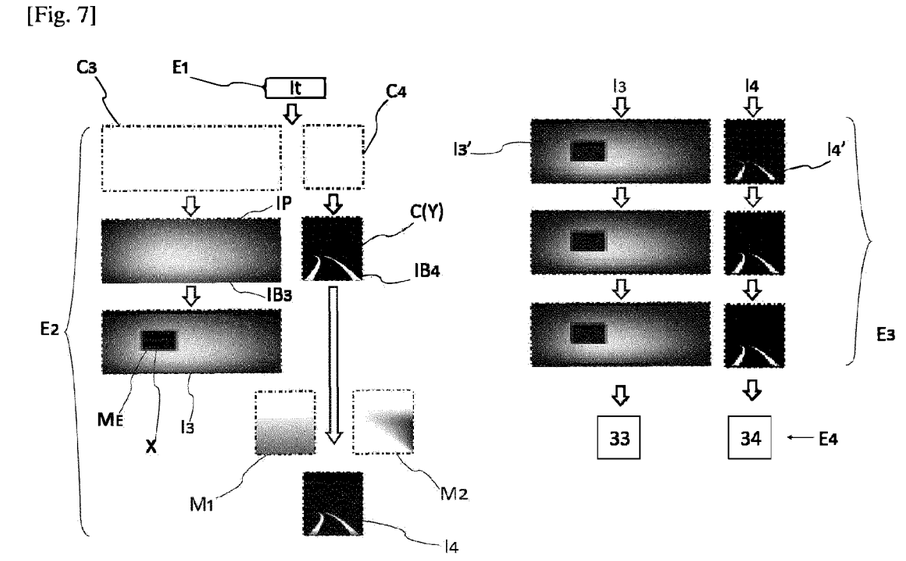
FIG. 7 shows a method for controlling the device from FIG. 1 according to a second embodiment of the invention.

FIG. 7 shows a method for controlling the lighting device 1 so as to emit another desired pixelated lighting function according to one embodiment of the invention.

In a first step E1, the controller 5 receives, from the controller 6 at a given time, an instruction It to emit a high-beam function in accordance with European regulations, plus an anti-dazzle function, of the type of a rectangle with blurred edges for a target vehicle being passed and positioned at coordinates X, and a ground marking function of the type with simple lines having a given equation Y.

Upon receiving the instruction, in a second step E2, the controller 5 will create, for each of the lighting modules 3 and 4, a new digital image I3 and I4 implementing a portion of the desired pixelated lighting function in the frames C3 and C4.

For the lighting module 3, the controller 5 selects, from its memory, a photometric image IP corresponding to a high-beam lighting function in accordance with European regulations. For the lighting module 4, the controller constructs a layer C(Y) comprising a pattern in the form of a pair of lines corresponding to the given equation Y and adds this layer to a black image. The photometric image IP thus forms a base image IB3, and the layer C added to the black image forms a base image IP4.

Second of all, the controller 5 constructs an anti-dazzle mask ME in the form of a matrix of dimensions identical to those of the frame C3 and in which a rectangular area having dimensions and positions that are defined on the basis of the coordinates X has a coefficient of zero so as to form a dark tunnel. The coefficients of the edges of the rectangular area have been determined so as to form intensity gradients on the edges of the dark tunnel. The controller 5 thus applies the mask ME to the base image IB3 so as to form a digital image I3.

Furthermore, the controller 5 selects, from its memory, the first attenuation mask comprising a vertical intensity gradient M1 and the second attenuation mask comprising an oblique intensity gradient M2, and thus successively applies the masks M1 and M2 to the base image IB4 so as to obtain a digital image I4.

In a third step E3, each digital image I3 and I4 will be corrected by the controller 5 according to the types of light sources 31 and 41 and optical device 32 and 42 and according to the resolution of the lighting modules 3 and 4.

First of all, the digital images I3 and I4 are sampled by the controller 5 so as to obtain digital images I3' and I4' with a resolution corresponding to those of the lighting modules 3 and 4.

The controller 5 then applies a filter to the sampled digital images I3' and I4' so as to adapt the values of the pixels of these images so as to compensate for the shape and the homogeneity of the pixels created by the light-emitting elements of the pixelated light sources 31 and 41, the inter-pixel overlaps between them and the aberrations and the inhomogeneities introduced by the lenses 32 and 42.

The controller 5 then applies a homogeneity mask in order to compensate for the differences in relative homogeneities of the pixels with respect to one another due to manufacturing tolerances of the light sources.

Since the vehicle is traveling on a road with zero slope, no vertical translation is applied to the sampled digital images and no attenuation mask is necessary.

Figure 8:
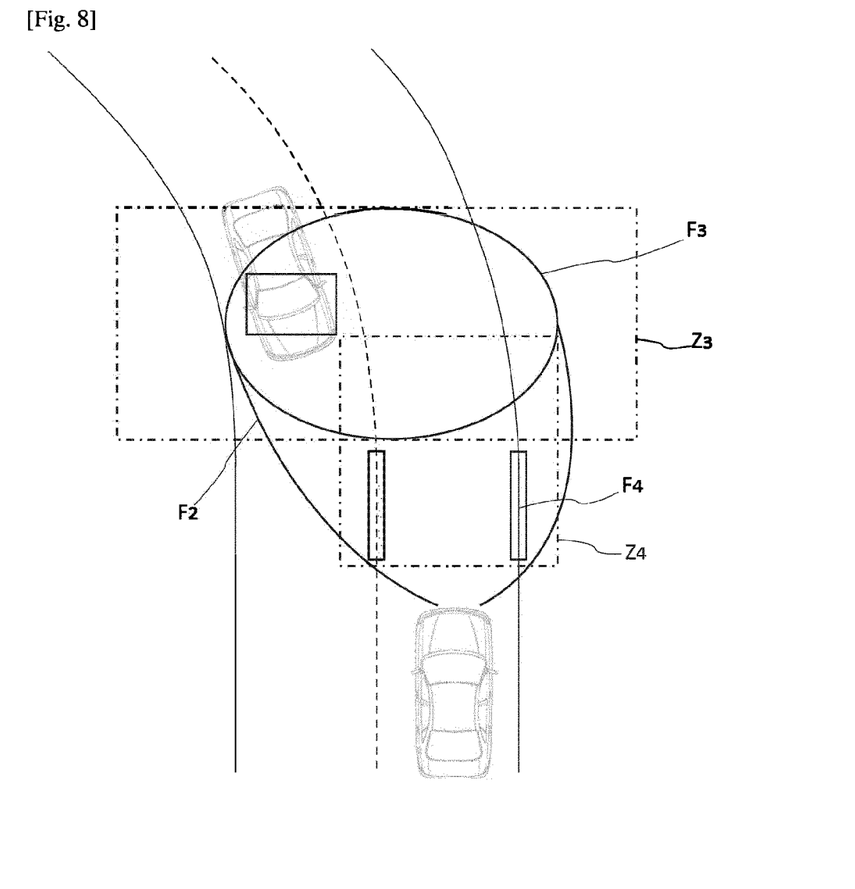
FIG. 8 shows a plan view of the light beams emitted by the device from FIG. 1 controlled by the method according to FIG. 6.
Figure 9:
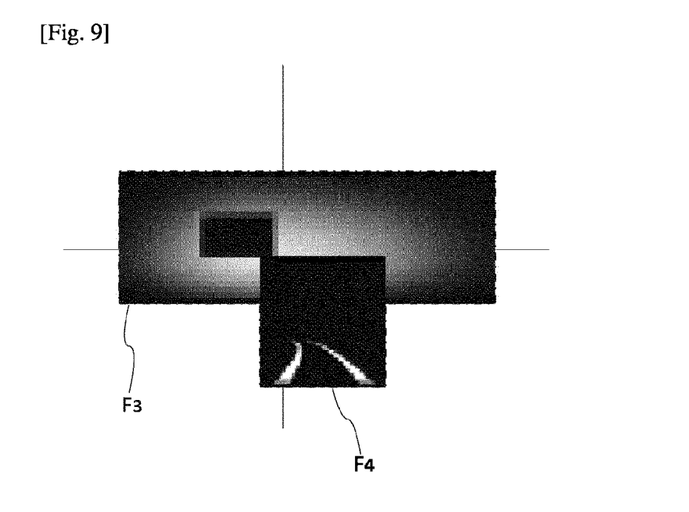
FIG. 9 shows a projection onto a screen of the light beams emitted by the device from FIG. 1 controlled by the method according to FIG. 6.

Finally, in a fourth step E4, the corrected digital images I3' and I4' are transmitted to the control units 33 and 43 of the modules 3 and 4, which selectively control each of the light-emitting elements of the light sources 31 and 41 so as to emit an elementary light beam forming, in the predetermined emission area Z3 and Z4, a pixel the intensity of which corresponds to the value of the corresponding pixel in the corrected digital image. [FIG. 8] thus shows a plan view of the pixelated beams F3 and F4 emitted by the lighting modules 3 and 4, as well as the beam F2 emitted by the lighting module 2, and [FIG. 9] shows a projection of these beams F3 and F4 onto a screen.

The above description clearly explains how the invention makes it possible to achieve the objectives that it has set itself, and in particular by proposing a method for controlling a lighting device that first of all creates, for each lighting module of the device capable of emitting a pixelated light beam, a digital image independently of the intrinsic emission features of the lighting module, and that, second of all, adapts this digital image to these intrinsic emission features. It will thus be understood that the first step of the method has to be developed only once, and that it may easily be updated, for example in order to incorporate new functions, without having to take into account any intrinsic feature of the module, such as for example the type of light source used. In addition, the second adaptation step may also be easily developed for any type of lighting module, since it does not take into account the type of digital image created upstream.

In any event, the invention should not be regarded as limited to the embodiments specifically described in this document and in particular embraces all equivalent means and any technically operative combination of these means.

What is claimed is:

1. A method for controlling a lighting device of a motor vehicle comprising one or more lighting modules, with at least one of the one or more lighting modules comprising a plurality of light sources and an optical device that is designed to emit a pixelated light beam in a predetermined emission area, the method comprising:
   receiving an instruction to emit a desired pixelated lighting function;
   creating, for each of the one or more lighting modules, a digital image implementing a portion of the desired pixelated lighting function within a frame corresponding to the predetermined emission area of the one or more lighting modules;
   correcting, for each of the one or more lighting modules, said created digital image on the basis of the plurality of light sources and the optical device of the one or more lighting modules; and
   emitting, from each of the one or more light modules, a pixelated light beam in the predetermined emission area corresponding to the corrected digital image.

2. The method as claimed in claim 1, wherein creating the digital image comprises selecting at least one photometric image stored in memory, corresponding to a predetermined regulatory photometric function, so as to form a base image in the frame on the basis of the received transmission instruction, with the digital image being created from the base image.

3. The method as claimed in claim 2, wherein a transformation is applied to the at least one photometric image responsive to the received transmission instruction to form the base image.

4. The method as claimed in claim 2, wherein of creating the digital image comprises selecting at least one layer stored in memory and positioning the at least one layer in the frame to form a base image in the frame responsive to the received emission instruction, with the digital image being created from the base image.

5. The method as claimed in claim 2, wherein creating the digital image comprises selecting one or more masks stored in memory responsive to the received emission instruction, with the digital image being created by successively applying said one or more masks to the base image.

6. The method as claimed in claim 2, wherein creating the digital image comprises constructing an anti-dazzle mask that contains at least one dark tunnel positioned responsive to the received emission instruction and wherein the anti-dazzle mask is applied to the base image.

7. The method as claimed in claim 2, wherein creating the digital image comprises applying an attenuation mask to all or part of the base image, with the attenuation mask comprising a vertical or oblique attenuation gradient.

8. The method as claimed in claim 1, wherein correcting the created digital image comprises sampling the created digital image responsive to a number of the plurality of light sources of the one or more lighting modules.

9. The method as claimed in claim 1, wherein of correcting the created digital image comprises applying a mask to the created digital image responsive to the types of light sources and optical device of the lighting module.

10. The method as claimed in claim 1, wherein of correcting the created digital image comprises applying an anti-aliasing filter to the created digital image.

11. The method as claimed in claim 1, wherein of correcting the created digital image comprises applying a homogeneity mask to the created digital image responsive to relative homogeneity of the light sources of the lighting module.

12. The method as claimed in claim 1, wherein correcting the created digital image comprises applying a translation to the created digital image responsive to the pitch of the motor vehicle, of the roll of the motor vehicle or of the slope of the road on which the motor vehicle is moving.

13. The method as claimed in claim 1, wherein creating the digital image comprises constructing at least one layer and positioning the at least one layer in the frame to form a base image in the frame responsive to the received emission instruction, with the digital image being created from the base image.

14. The method as claimed in claim 1, wherein creating the digital image comprises constructing one or more masks responsive to the received emission instruction, with the digital image being created by successively applying the one or more masks to the base image.

15. The method as claimed in claim 1, wherein correcting the created digital image comprises applying a compensation filter to the created digital image responsive to types of the light sources and the optical device of the lighting module.

16. The method as claimed in claim 1, wherein correcting the created digital image comprises applying a rotation to the created digital image responsive to the pitch of the motor vehicle, of the roll of the motor vehicle, or of the slope of the road on which the motor vehicle is moving.

17. A computer program comprising a program code that is designed to implement a method comprising:
   receiving an instruction to emit a desired pixelated lighting function;

creating, for each of the one or more lighting modules, a digital image implementing a portion of the desired pixelated lighting function within a frame corresponding to the predetermined emission area of the one or more lighting modules;

correcting, for each of the one or more lighting modules, said created digital image on the basis of the plurality of light sources and the optical device of the one or more lighting modules; and emitting, from each of the one or more light modules, a pixelated light beam in the predetermined emission area corresponding to the corrected digital image.

18. A data medium containing a computer program that is designed to implement a method comprising:

receiving an instruction to emit a desired pixelated lighting function;

creating, for each of the one or more lighting modules, a digital image implementing a portion of the desired pixelated lighting function within a frame corresponding to the predetermined emission area of the one or more lighting modules;

correcting, for each of the one or more lighting modules, said created digital image on the basis of the plurality of light sources and the optical device of the one or more lighting modules; and emitting, from each of the one or more light modules, a pixelated light beam in the predetermined emission area corresponding to the corrected digital image.

* * * * *